(No Model.)
A. P. CRAIG.
VEHICLE AXLE.
No. 512,867. Patented Jan. 16, 1894.
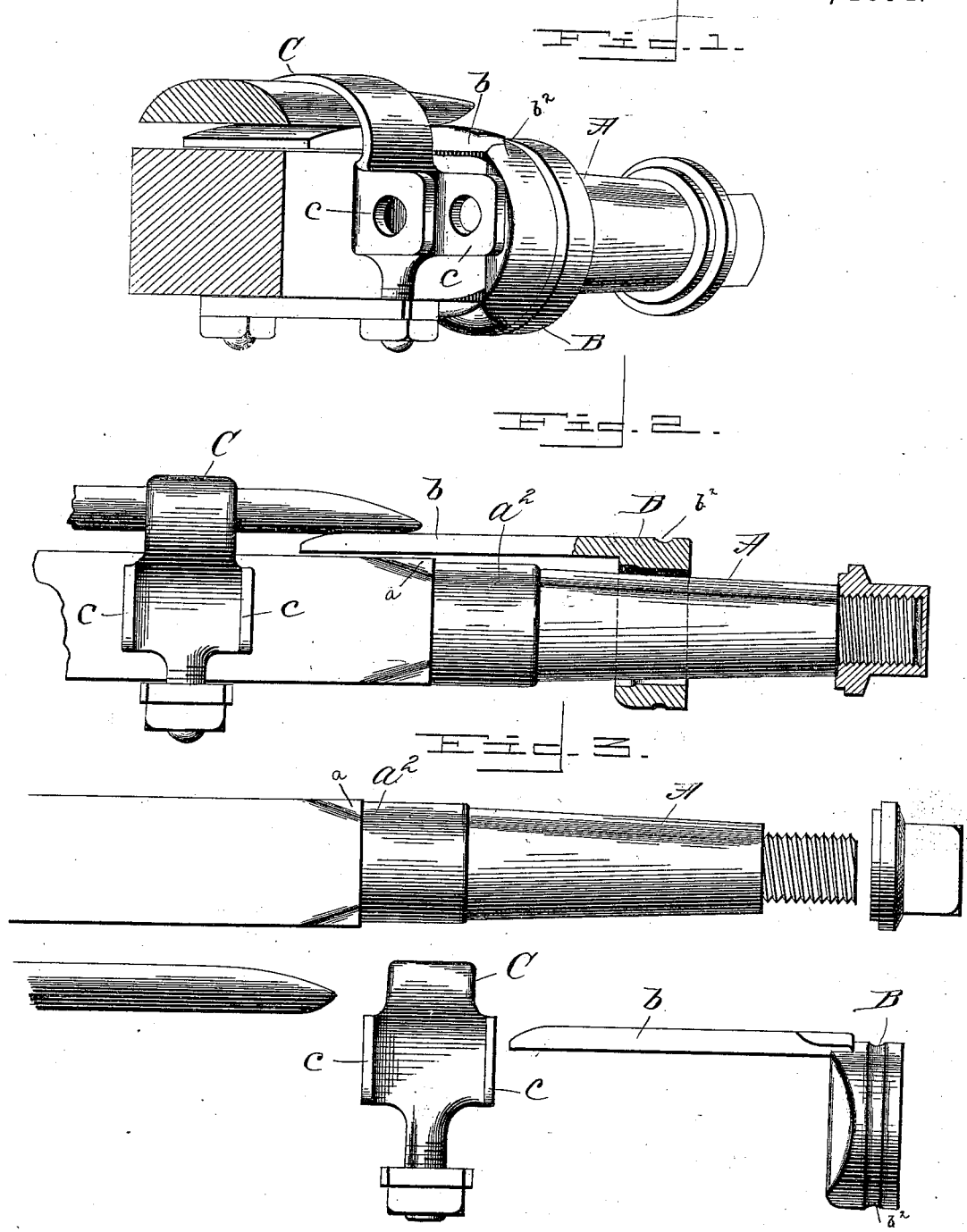
WITNESSES:
INVENTOR
Augustus P. Craig
BY
ATTORNEY

UNITED STATES PATENT OFFICE.

AUGUSTUS P. CRAIG, OF MICHIGAN CITY, INDIANA.

VEHICLE-AXLE.

SPECIFICATION forming part of Letters Patent No. 512,867, dated January 16, 1894.

Application filed June 16, 1893. Serial No. 477,776. (No model.)

*To all whom it may concern:*

Be it known that I, AUGUSTUS P. CRAIG, a citizen of the United States, residing at Michigan City, in the county of La Porte, State of Indiana, have invented certain new and useful Improvements in Vehicle-Axles; and I do hereby declare the following to be a full, clear, and exact description of the invention, such as will enable others skilled in the art to which it appertains to make and use the same.

This invention relates to certain new and useful improvements in vehicle axles.

The object of the invention is to provide a vehicle axle by the use of which the wear and tear incident to the impingement of the hub-band of the vehicle wheel may be compensated for in a simple, cheap, and reliable manner, and whereby the wheel may be prevented from moving in and out on the axle spindle, the same being thereby held in place and causing less friction.

With these objects in view the invention consists in the various novel details of construction and arrangement as hereinafter more fully set forth and illustrated in the specification and claims.

I have illustrated the invention in the accompanying drawings in which—

Figure 1 represents a perspective view of the axle, showing the parts in their proper relative positions. Fig. 2 is a view partly in section of the same; and Fig. 3 is a view showing the various parts of my device.

In the drawings, A represents the spindle, which is preferably made up of a rounded portion and an extended square portion having beveled corners, and preferably with an oil strip $a$ on its upper face, and raised bearing $a^2$ at the heel, against which the hub of the wheel impinges.

B represents a collar, which is preferably constructed of case hardened steel or other wear resisting material; this collar is designed to be slipped over the spindle A, and has an elongated strap or extension $b$ which rests upon the square portion of the spindle. This collar has extending around the periphery of its rounded portion, a groove or channel $b^2$ the purposes of which will hereinafter be set forth.

C represents a clip designed to pass over the collar and spindle and serve to secure the same together. This clip, if desired, may be formed with ears $c\ c$ to which the shafts of the vehicle may be attached.

I am aware that it is not new to place an adjustable collar upon a spindle and attach the same by means of bolts passing through the body of the axle, but this form of construction is objectionable in that the holes weaken the spindle and render the same liable to bend or break; and furthermore when it is desired to recompense a small amount of wear and tear on the spindle, it is necessary to move the collar the distance of the key, which is generally a quarter of an inch or more; and then again, in this form of construction referred to the sleeve and collar rest directly over the rounded or weak portion of the spindle which leaves the bearing in the hub directly over the rounded portion of the spindle.

By the use of my device, these and numerous other objections are overcome, and the collar may be adjusted the width of a hair, by simply loosening the clip, then tightening the same, after the collar has been shoved the necessary distance.

An additional advantage which my form of device presents over the state of the art so far as I have been able to examine it, is its ease of application to old vehicles, the drilling of holes or other mechanical labor being entirely obviated, and the collar being formed of case hardened metal, will resist the wear and tear incident to use for a much greater length of time than in the ordinary construction of detachable and removable collars.

Having thus fully described my invention, what I claim as new, and desire to secure by Letters Patent, is—

1. The combination with a vehicle-axle, of an adjustable collar, provided with a sleeve and flattened extension, loosely secured to the axle by means of a clip, substantially as described.

2. The combination with a vehicle axle, consisting of a rounded spindle having a square portion, said square portion being provided with a raised bearing at its heel, and an oil strip on its upper face, of a loose collar, provided with a sleeve and flattened extension, adjustably secured to the axle by means of a clip, substantially as set forth.

In testimony whereof I affix my signature in presence of two witnesses.

AUGUSTUS P. CRAIG.

Witnesses:
J. H. HANNEN,
GEO. H. CHANDLEE.